US 9,139,220 B2

(12) United States Patent
Hong et al.

(10) Patent No.: US 9,139,220 B2
(45) Date of Patent: Sep. 22, 2015

(54) STEERING SYSTEM OF AUTOMOBILE

(71) Applicants: Hyundai Motor Company, Seoul (KR); Kia Motors Corporation, Seoul (KR); Namyang Ind. Co., Ltd., Ansan-si (KR)

(72) Inventors: Sung-Jong Hong, Seoul (KR); Kwang Mo Koo, Suwon-si (KR); Tae Young Kim, Anyang-si (KR); Jung-Woo Park, Busan (KR); Jin-Ho Bae, Suwon-si (KR); Joon Mo Park, Seoul (KR); Sang-Gyu Yoon, Seoul (KR)

(73) Assignees: HYUNDAI MOTOR COMPANY, Seoul (KR); KIA MOTORS CORPORATION, Seoul (KR); NAMYANG IND. CO., LTD., Ansan-Si (KR)

( * ) Notice: Subject to any disclaimer, the term of this patent is extended or adjusted under 35 U.S.C. 154(b) by 0 days.

(21) Appl. No.: 14/253,723

(22) Filed: Apr. 15, 2014

(65) Prior Publication Data
US 2014/0312603 A1   Oct. 23, 2014

(30) Foreign Application Priority Data
Apr. 18, 2013   (KR) .................. 10-2013-0042770

(51) Int. Cl.
*B62D 1/19*   (2006.01)
(52) U.S. Cl.
CPC ...................... *B62D 1/195* (2013.01)
(58) Field of Classification Search
CPC ........... B62D 1/195; B62D 1/192; B62D 1/19
USPC ........................................................ 280/777
See application file for complete search history.

(56) References Cited

U.S. PATENT DOCUMENTS

| | | | | |
|---|---|---|---|---|
| 3,707,096 A | * | 12/1972 | Bennett ........................... | 74/492 |
| 8,430,428 B2 | * | 4/2013 | Tinnin ........................... | 280/779 |
| 2006/0049620 A1 | * | 3/2006 | Lee ................................. | 280/777 |
| 2012/0112443 A1 | * | 5/2012 | Arakawa et al. .............. | 280/777 |
| 2012/0240711 A1 | * | 9/2012 | Minamigata et al. .......... | 74/493 |
| 2012/0273291 A1 | * | 11/2012 | Akutsu et al. ................. | 180/443 |
| 2014/0195816 A1 | * | 7/2014 | Mantin et al. ................. | 713/189 |
| 2014/0197293 A1 | * | 7/2014 | Fujiwara et al. ........... | 248/274.1 |
| 2014/0290423 A1 | * | 10/2014 | Kogure ........................... | 74/493 |
| 2014/0311274 A1 | * | 10/2014 | Hong et al. ..................... | 74/493 |
| 2014/0327235 A1 | * | 11/2014 | Kwon ........................... | 280/777 |

FOREIGN PATENT DOCUMENTS

| | | |
|---|---|---|
| JP | 3969431 B2 | 6/2007 |
| JP | 2009-202638 A | 9/2009 |
| KR | 2002-0001136 A | 1/2002 |
| KR | 10-2012-0042214 A | 5/2012 |
| WO | WO 2013015339 A1 * | 1/2013 |

* cited by examiner

*Primary Examiner* — James English
(74) *Attorney, Agent, or Firm* — Morgan, Lewis & Bockius LLP

(57) ABSTRACT

A steering system of an automobile may include a mounting bracket having a flange portion supporting a steering column and contacting with an automobile body, and an opening hole formed at the flange portion and opening toward one side of the flange portion, a capsule slidably coupled to the opening hole and adapted to be decoupled from the opening hole when an impact is given thereto, and at least one molded supporter fixing the capsule and the flange portion and adapted to be sheared off from the capsule or the flange portion when the impact is given thereto.

18 Claims, 9 Drawing Sheets

STEERING SYSTEM OF AUTOMOBILE

CROSS-REFERENCE TO RELATED APPLICATION

The present application claims priority to Korean Patent Application No. 10-2013-0042770 filed on Apr. 18, 2013, the entire contents of which is incorporated herein for all purposes by this reference.

BACKGROUND OF THE INVENTION

1. Field of the Invention

The present invention relates to a steering system of an automobile. More particularly, the present invention relates to a steering system of an automobile steering column that can improve stability as a consequence of contracting immediately in an axial direction when external impact is given.

2. Description of Related Art

Generally, a steering system of an automobile is used for changing moving direction of the automobile according to a driver's intention. The steering system includes a steering manipulation device including a steering wheel and a steering column, a steering gear box changing a direction of steering force transmitted from the steering manipulation device and increasing torque, and a steering link device transmitting the steering force of the steering gear box to both wheels.

Recently, the steering system can perform telescopic function or tilt function for changing a position and an angle of the steering wheel according to height or body type of the driver. The telescopic device adjustment of a distance between the steering wheel and the driver by lengthening or shortening a length of the steering column according to the body type of the driver. The tilt device adjustment of the angle of the steering wheel according to the body type or a position of the driver.

The steering system is fixed to an automobile body and includes a mounting bracket supporting the steering column. The mounting bracket is provided with a capsule that can be broken by strong impact. Therefore, the capsule is broken when the automobile brakes suddenly or crashes another automobile, the steering column contracts in an axial direction and the driver is protected.

However, the steering column cannot contract sufficiently in the axial direction due to transverse deformation of the steering column in a car crash, and thus risk of injuries to the driver may increase according to a conventional steering system.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing steering system of an automobile having advantages of improving stability by facilitating contraction of steering column in an axial direction.

In an aspect of the present invention, a steering system of an automobile may include a mounting bracket having a flange portion supporting a steering column and contacting with an automobile body, and an opening hole formed at the flange portion and opening toward one side of the flange portion, a capsule slidably coupled to the opening hole and adapted to be decoupled from the opening hole when an impact is given thereto, and at least one molded supporter fixing the capsule and the flange portion and adapted to be sheared off from the capsule or the flange portion when the impact is given thereto.

The at least one molded supporter is formed by solidifying molten resin after filling a space between the capsule and the flange portion with the molten resin.

A pair of molded supporters is provided along both sides of the opening hole on which the capsule is configured to slide.

At least one stepped portion for receiving the molten resin is dented at the flange portion along a side of the opening hole on which the capsule is configured to slide.

A first insertion hole is formed on and is connected to the at least one stepped portion, and the first insertion hole is adapted to receive the molten resin.

The at least one molded supporter may include a first supporting portion corresponding to the at least one stepped portion and a second supporting portion corresponding to the first insertion hole.

A second injection hole is formed at a portion of the capsule contacting with the flange portion, and the molten resin is injected through the second injection hole.

A molded pin is formed by solidifying the molten resin filling with the second injection hole, and the molded pin fixes the capsule to the molded supporter and is adapted to be sheared off by the impact.

A distance between both sides of the opening hole becomes wider toward the one side.

The both sides of the opening hole form an angle of about 8° to 12°.

The capsule may include a slide groove to slidably receive the at least one molded supporter therein.

In another aspect of the present invention, a steering system of an automobile may include a mounting bracket having a flange portion contacting with an automobile body, and an opening hole formed at the flange portion and opening toward one side of the flange portion, a capsule slidably coupled to the opening hole and adapted to be decoupled from the opening hole when an impact is given, at least one molded supporter fixing the capsule and the flange portion and adapted to be sheared off from the capsule or the flange portion when the impact is given, and at least one molded pin fixing the molded supporter to the capsule and adapted to be sheared off by the impact.

At least one stepped portion is dented at the flange portion along a side of the opening hole on which the capsule is adapted to slide, and the at least one molded supporter is formed by solidifying molten resin after filling the stepped portion with the molten resin.

A first insertion hole connected to the at least one stepped portion and receiving the molten resin is formed on the at least one stepped portion.

The at least one molded supporter may include a first supporting portion corresponding to the at least one stepped portion and a second supporting portion corresponding to the first insertion hole.

A second injection hole is formed at a portion of the capsule contacting with the flange portion, and the molten resin is injected through the second injection hole.

The molded pin is formed by solidifying the molten resin filling with the second injection hole.

A distance between both sides of the opening hole becomes wider toward the one side and wherein the both sides of the opening hole form an angle of about 8° to 12°.

The capsule may include a slide groove to slidably receive the at least one molded supporter therein.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
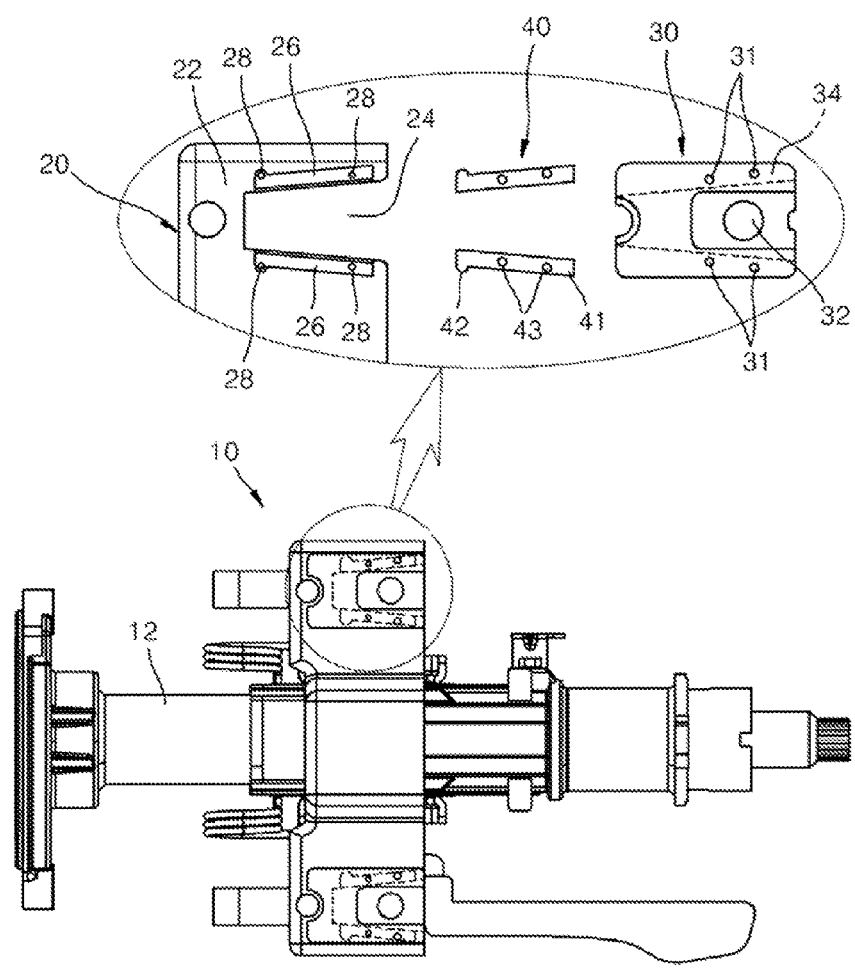
FIG. 1 is a schematic diagram of a steering system of an automobile according to the various exemplary embodiments of the present invention with a capsule being disassembled from a mounting bracket.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a steering system of an automobile according to an exemplary embodiment of the present invention will be described in detail with reference to the attached drawings.

Figure 2:
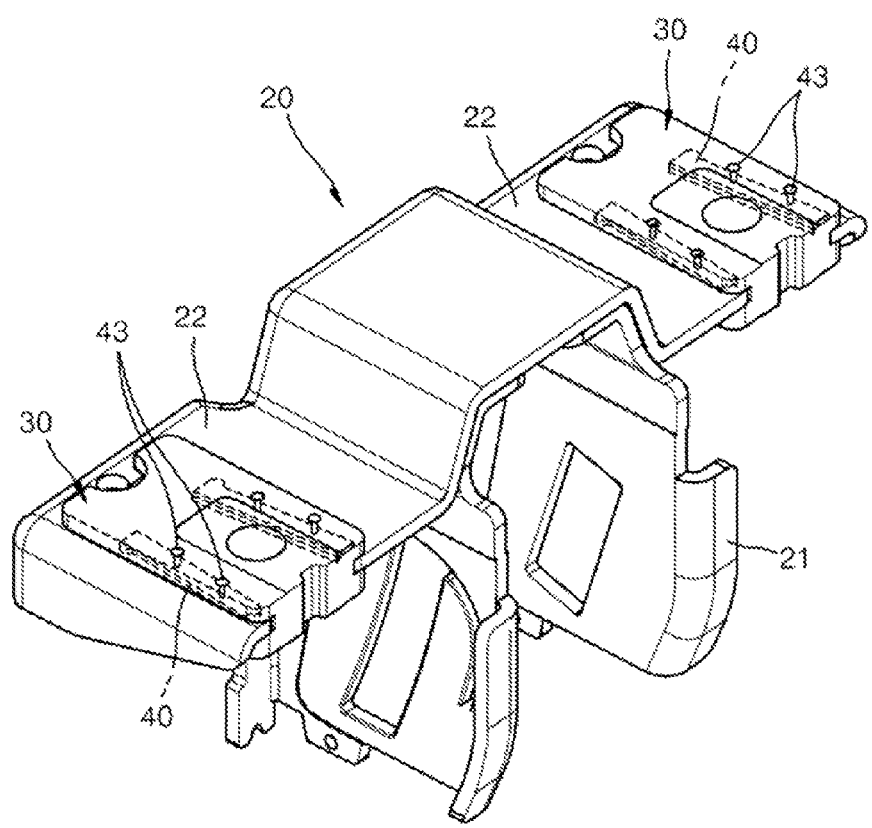
FIG. 2 is a perspective view of a mounting bracket coupled with a capsule in the various exemplary embodiments of the present invention.
Figure 3:
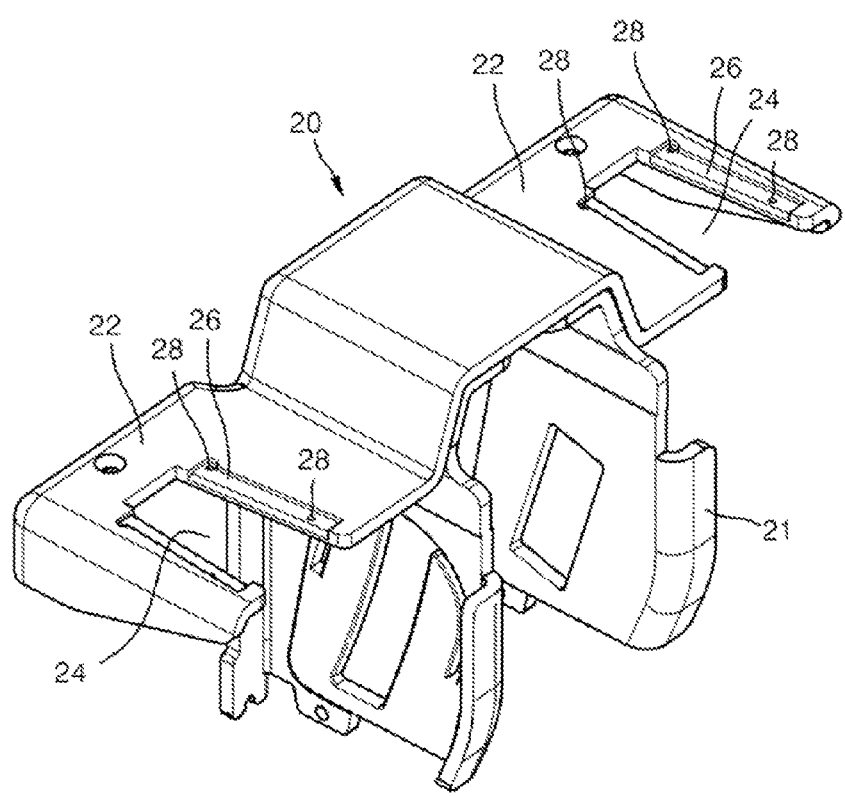
FIG. 3 is a perspective view of a mounting bracket according to the various exemplary embodiments of the present invention.
Figure 4:
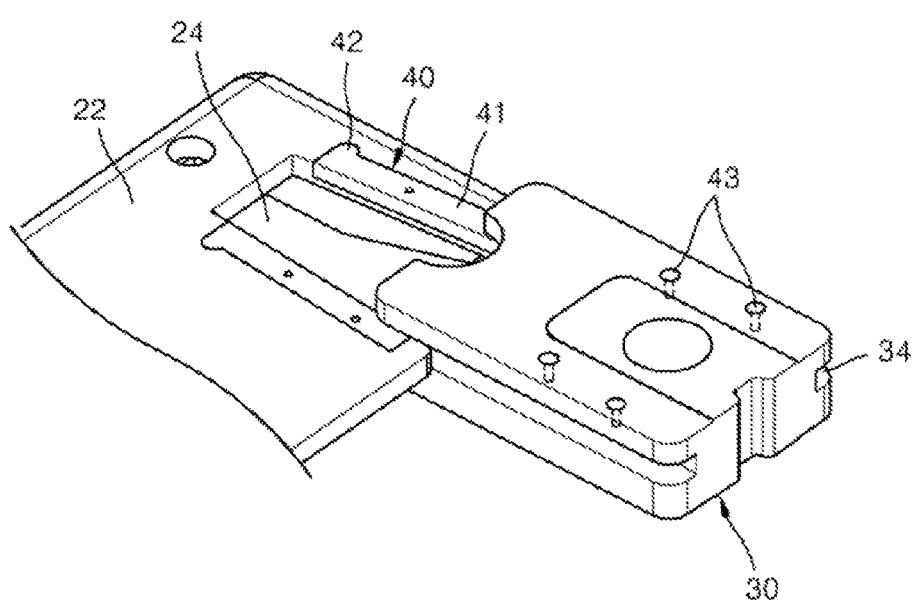
FIG. 4 is a perspective view of a capsule leaving a mounting bracket in the various exemplary embodiments of the present invention.
Figure 5:
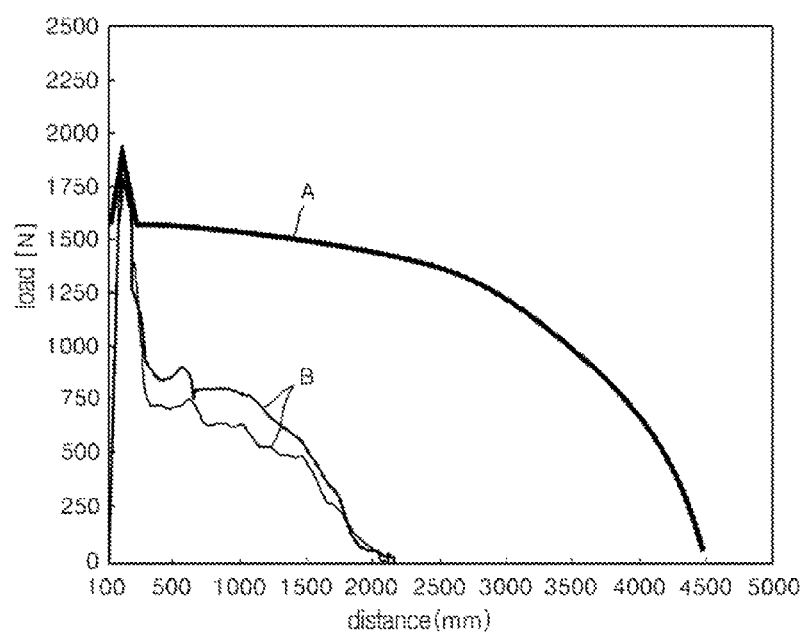
FIG. 5 is a graph illustrating change of load when external impact is applied to a steering system.

FIG. 1 is a schematic diagram of a steering system of an automobile according to the various exemplary embodiments of the present invention with a capsule being disassembled from a mounting bracket. FIG. 2 is a perspective view of a mounting bracket coupled with a capsule in the various exemplary embodiments of the present invention. FIG. 3 is a perspective view of a mounting bracket according to the various exemplary embodiments of the present invention. FIG. 4 is a perspective view of a capsule leaving a mounting bracket in the various exemplary embodiments of the present invention. FIG. 5 is a graph illustrating change of load when external impact is applied to a steering system.

Referring to FIG. 1 to FIG. 4, a steering system 10 of an automobile according to the various exemplary embodiments of the present invention includes a steering column 12, a mounting bracket 20, a capsule 30, a molded supporter 40 and a molded pin 43.

The mounting bracket 20 is configured to wrap around the steering column 12 and a tilt bracket 21 is formed at a side of the mounting bracket 20. A pair of flange portions 22 contacting with an automobile body is formed at both sides of a part of the mounting bracket 20 wrapping around the steering column 12. An opening hole 24 opening toward one side is formed at each flange portion 22. Both sides of the opening hole 24 form an angle of about 8° to 12° so as for the capsule 30 to leave the opening hole 24, and a distance between the both sides of the opening hole 24 becomes wider toward the one side. For example, the both sides of the opening hole 24 may form an angle of 10°.

A pair of stepped portions 26 is formed at the flange portion 22 along both side surfaces of the opening hole 24 on which the capsule 30 can slide. The stepped portion 26 is filled with a molten resin. Each stepped portion 26 is formed at an upper surface and an interior surface of the flange portion 22 close to the both sides of the opening hole 24. That is, referring to FIG. 3, the stepped portion 26 is formed as ']' shape. The stepped portions 26 may be formed at a portion or an entire length of the both side surfaces of the opening hole 24.

Herein, a plurality of insertion holes 28 may be formed at each stepped portion 26 of the flange portion 22. The insertion holes 28 are connected to the corresponding stepped portion 26 and a portion of the molten resin is injected into the insertion holes 28. The insertion holes 28 are formed apart from each other by predetermined distances. For example, two insertion holes 28 are formed at each stepped portion 26, and the two insertion holes 28 are disposed apart from each other along a sliding direction of the capsule 30.

A pair of sliding grooves 34 is formed at both side surfaces of the capsule 30. The both sides of the opening hole 24 are slidably inserted in the pair of sliding grooves 34. Therefore, the capsule 30 is slidably coupled to the opening hole 24. In addition, an engaging hole 32 is formed at the capsule 30 such that the capsule 30 is coupled to the automobile body through a fastening member inserted in the engaging hole 32. Furthermore, a plurality of injection holes 31 is formed at a portion of the capsule 30 contacting with the flange portion 22. The plurality of injection holes 31 is disposed apart from each other along the sliding direction of the capsule 30 by predetermined distances. The molten resin is poured into the plurality of injection holes 31 so as to fill the stepped portion 26. In the present exemplary embodiment, a diameter of each injection hole 31 may be 1.1 mm, but is not limited thereto. The diameter of the injection hole 31 is the same as that of the molded pin 43. In addition, diameters of the injection holes 31 according to the present exemplary embodiment are smaller than those of conventional injection holes.

Meanwhile, the molded supporter 40 is formed by solidifying the molten resin supplied to the stepped portion 26 through the injection holes 31. That is, the molten resin is supplied to the stepped portion 26 through the injection holes 31 in a state that the capsule 30 is coupled to the mounting bracket 20. After that, the molten resin is solidified at the stepped portion 26 and forms the molded supporter 40. Synthetic resin such as plastic may be used as the molten material. A pair of molded supporters 40 is provided respectively at the both sides of the opening hole 24 on which the capsule 30 can slide. Each molded supporter 40 includes a first supporting portion 41 corresponding to the stepped portion 26 and a second supporting portion 42 corresponding to each insertion hole 28. For better understanding, FIG. 1 illustrates that the molded supporter 40 according to the present exemplary embodiment is decoupled from the capsule 30 and the mounting bracket 20. However, since the molten resin is supplied to the stepped portion 26 and is solidified in a state that the capsule 30 is coupled to the mounting bracket 20 in reality, the molded supporter 40 is integrally coupled to the capsule 30 and the flange portion 22. The molded supporter 40 fixes the capsule 30 with the flange portion 22 at a normal state, but is sheared off from the capsule 30 and the flange portion 22 by external impact in car crash.

Each molded pin 43 is formed by solidifying the molten resin inserted in each injection hole 31 and has a pin shape. The molded pin 43 is integrally coupled to the capsule 30 and the molded supporter 40. Therefore, the molded pin 43 fixes the capsule 30 with the molded supporter 40 at the normal state, but is sheared off from the capsule 30 and the molded supporter 40 by the external impact in the car crash.

Manufacturing method of the molded supporter 40 according to the various exemplary embodiments of the present invention will be described in detail.

Firstly, the capsule 30 is slid and inserted into the opening hole 24 of the mounting bracket 20.

After that, the molten resin is supplied through the injection holes 31 of the capsule 30 and fills in the stepped portions 26 and the insertion holes 28. After the stepped portions 26 and the insertion holes 28 are filled with the molten resin, the injection holes 31 are also filled with the molten resin.

After that, the molten resin is solidified in the stepped portions 26 and the insertion holes 28 so as to form the molded supporter 40. In addition, the molten resin is solidified in the injection holes 31 so as to form the molded pins 43.

If the molten resin is solidified, the capsule 30 and the flange portion 22 of the mounting bracket 20 are fixed with each other.

If the car crash occurs or the external impact is applied to the steering system 10 at this state, the molded pin 43 is broken firstly and the molded supporter 40 is then sheared off. Therefore, the capsule 30 begins to leave the flange portion 22 of the mounting bracket 20. As the capsule 30 leaves, the steering column 12 contracts in an axial direction (vertical direction).

At this time, since the diameter of the molded pin 43 is smaller than that of the conventional molded pin, critical shear stress of the molded pin 43 becomes reduced, compared with the conventional molded pin. That is, since the molded pin 43 can be broken easily by smaller force, the capsule 30 can leave further quickly.

Although the diameter of the molded pin 43 is reduced, fixing force of the capsule 30 and the mounting bracket 20 can be secured sufficiently by the molded supporter 40 when the automobile runs. In addition, since the molded supporter 40 can be sheared off by a predetermined impact load, the capsule 30 can leave.

Meanwhile, FIG. 5 illustrates load (B) applied to a conventional steering column and load (A) applied to the steering column 12 according to the exemplary embodiment of the present invention. Herein, a horizontal axis indicates a contracting distance of the steering column 12 in the axial direction and a vertical axis indicates transverse load applied to the steering column 12 in FIG. 5. While load applied to the conventional steering column 12 is quickly reduced, load applied to the steering column 12 according to the present embodiment is gradually reduced by the molded supporter 40.

Since residual load is maintained by the molded supporter 40 when the capsule 30 leaves according to the exemplary embodiment of the present invention, it is prevented that the load applied to the steering column 12 is quickly reduced.

Referring to FIG. 5, when impact load is applied to the steering system 10 by the external impact or when the car crash occurs, the transverse load is applied to the steering column 12 as the capsule 30 leaves. In this case, after the strong transverse load is applied to the steering column 12, the transverse load applied to the steering column 12 is quickly reduced according to the conventional art (please refer to "B" in FIG. 5). Therefore, a transverse displacement of the steering column 12 increases. Thereby, it is difficult for the steering column 12 to contract in the vertical direction.

In comparison, when the transverse load is applied to the steering column 12 when the capsule 30 slides and leaves, the transverse load applied to the steering column 12 is gradually reduced according to the exemplary embodiment of the present invention (please refer to "A" in FIG. 5) because shear stress is maintained by the molded supporter 40. Therefore, transverse displacement of the steering column 12 may be minimized.

As described above, while the diameter of the molded pin 43 is minimized such that molded pin 43 is broken easily and initial load applied to the steering column 12 is reduced, the molded supporter 40 additional to the molded pin 43 is provided such that the molded supporter 40 is broken generally and the load applied to the steering column 12 decreases not quickly but gradually. Therefore, the transverse displacement of the steering column 12 may be minimizes and the steering column 12 may contract smoothly in the vertical direction.

In addition, since the molded supporter 40 includes the first supporting portion 41 formed by the molten resin filling in the stepped portion 26 and the second supporting portion 42 formed by the molten resin filling in the insertion hole 28 according to the various exemplary embodiments of the present invention, the molded supporter 40 is fixed to the mounting bracket 20 in further strict way. Therefore, the residual load may be maintained effectively.

Figure 6:
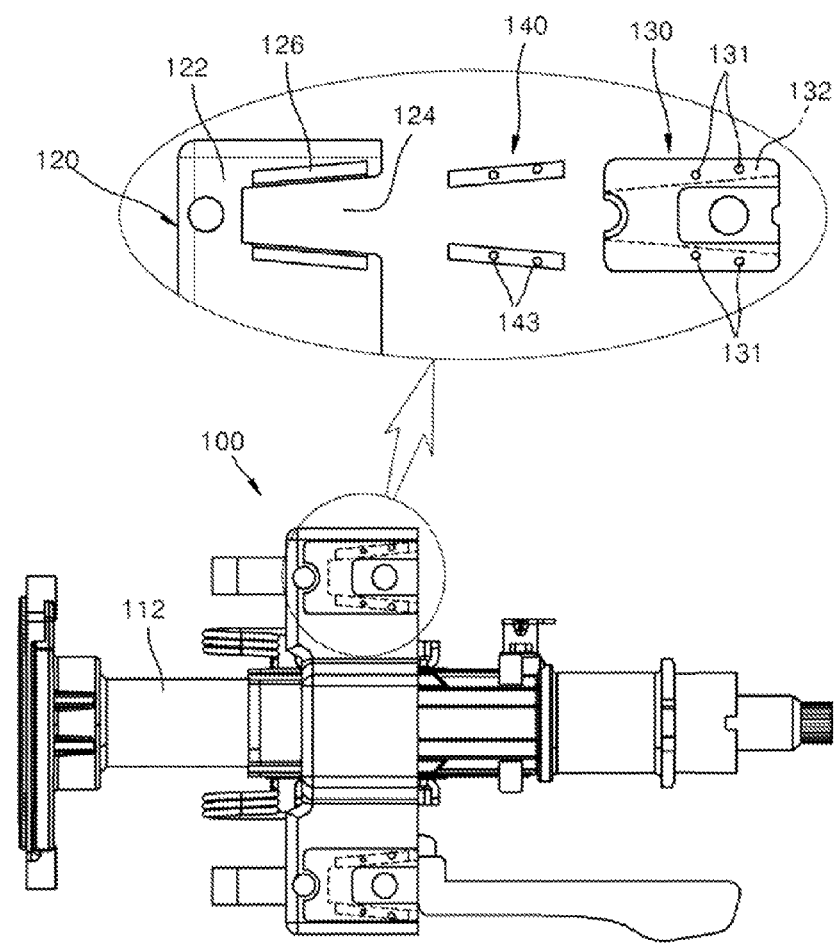
FIG. 6 is a schematic diagram of a steering system of an automobile according to the various exemplary embodiments of the present invention.
Figure 7:
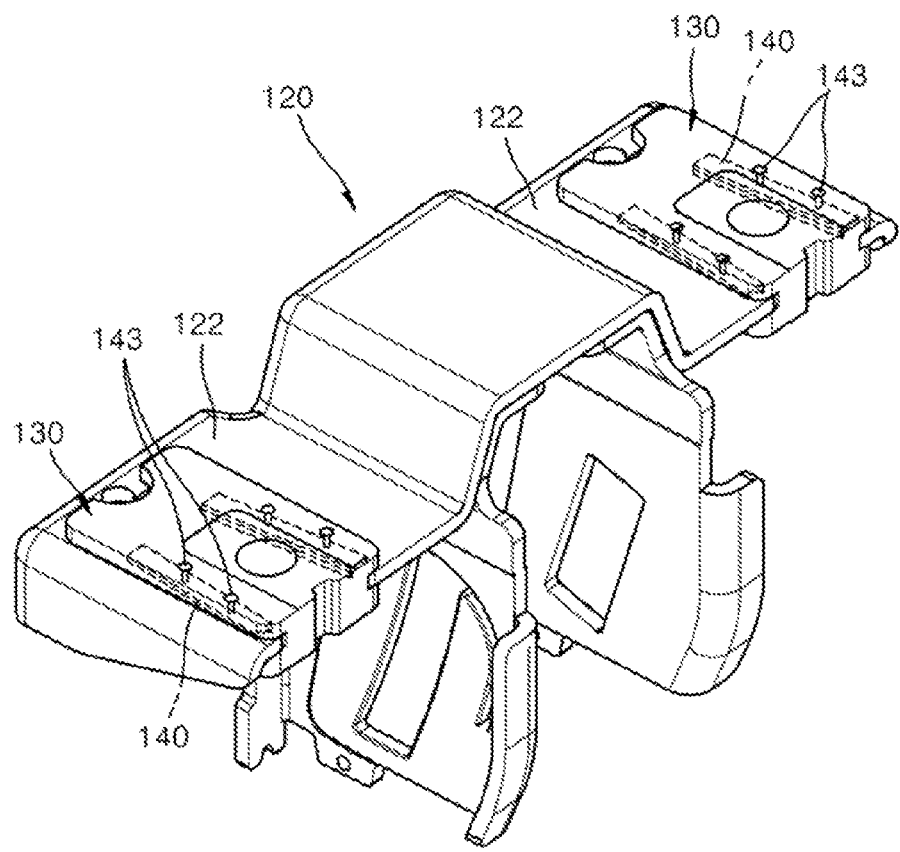
FIG. 7 is a perspective view of a mounting bracket coupled with a capsule in the various exemplary embodiments of the present invention.
Figure 8:
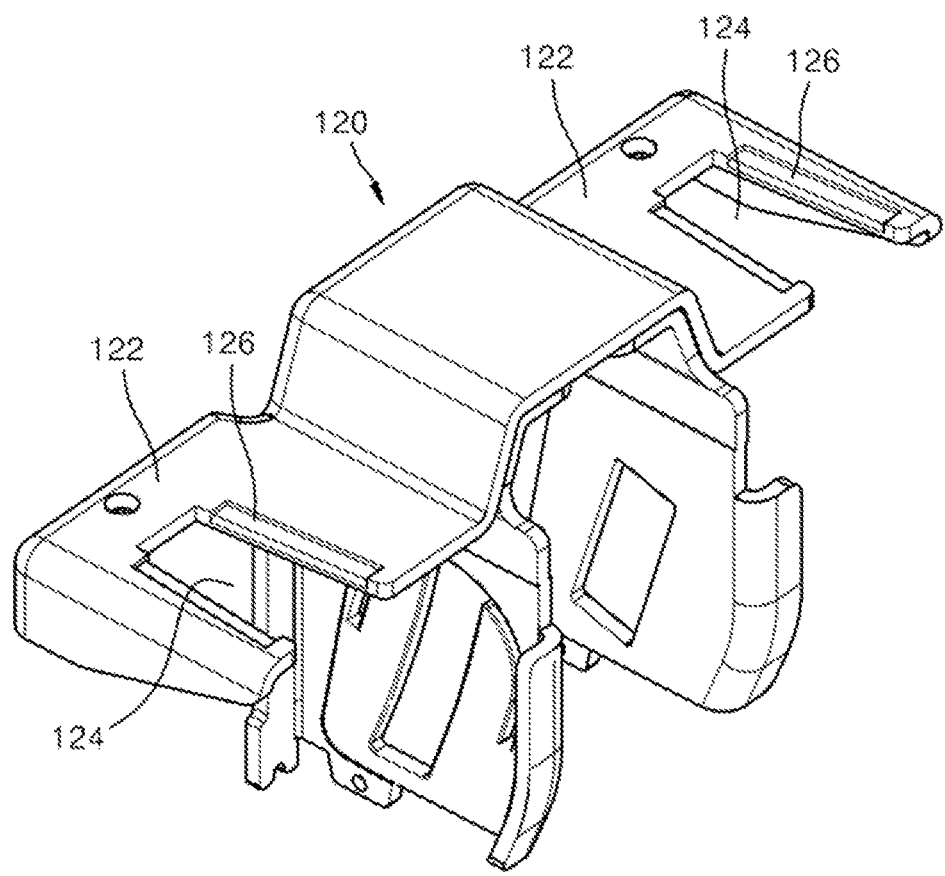
FIG. 8 is a perspective view of a mounting bracket according to the various exemplary embodiments of the present invention.
Figure 9:
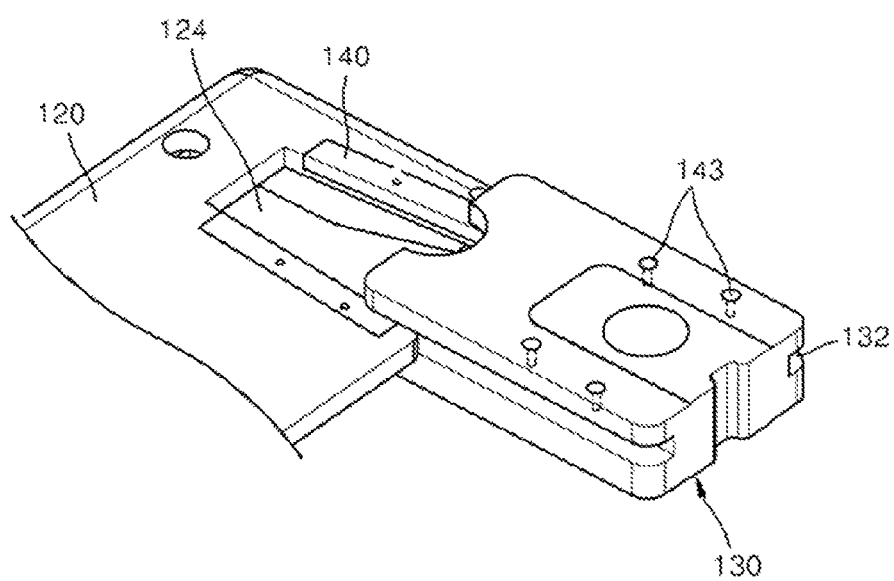
FIG. 9 is a perspective view of a capsule leaving a mounting bracket in the various exemplary embodiments of the present invention.

FIG. 6 is a schematic diagram of a steering system of an automobile according to the various exemplary embodiments of the present invention. FIG. 7 is a perspective view of a mounting bracket coupled with a capsule in the various exemplary embodiments of the present invention. FIG. 8 is a perspective view of a mounting bracket according to the various exemplary embodiments of the present invention. FIG. 9 is a perspective view of a capsule leaving a mounting bracket in the various exemplary embodiments of the present invention.

Referring to FIG. 6 to FIG. 9, a steering system of an automobile according to the various exemplary embodiments of the present invention includes the steering column 112, the mounting bracket 120, the capsule 130, the molded supporter 140 and the molded pin 143. In addition, the stepped portion 126 for receiving the molten resin is formed at the flange portion 122 of the mounting bracket 120. Contrary to the various exemplary embodiments of the present invention, however, the plurality of insertion holes is not formed at the stepped portion 126 in the various exemplary embodiments of the present invention.

Since the steering column 112, the mounting bracket 120, the flange portion 122, the capsule 130, the molded supporter 140 and the molded pin 143 according to the various exemplary embodiments of the present invention are the same as or correspond to those according to the various exemplary embodiments of the present invention, detailed description thereof will be omitted.

While the diameter of the molded pin 143 is minimized such that the molded pin 143 is broken easily and initial load applied to the steering column 112 is reduced, the molded supporter 140 additional to the molded pin 143 is provided such that the molded supporter 140 is broken generally and the load applied to the steering column 112 decreases not quickly but gradually according to the various exemplary embodiments of the present invention. Therefore, the transverse displacement of the steering column 112 may be minimizes and the steering column 112 may contract smoothly in the vertical direction.

In addition, referring to FIG. 6, a shape of the molded supporter 126 is simplified. Therefore, the molded supporter 126 may be manufactured easily.

Since the molded supporter for fixing the mounting bracket and the capsule is provided additionally to the molded pin, residual load may be maintained by the molded supporter when the car crash occurs and the capsule leaves according to the exemplary embodiments of the present invention. Therefore, it may be prevented that the load applied to the steering column is quickly reduced. In addition, the transverse displacement of the steering column may be minimized and the steering column may contract smoothly in the vertical direction.

In addition, fixing force of the capsule and the mounting bracket may be sufficiently secured by the molded supporter when the automobile runs even though the diameter of the molded pin is minimized. In addition, the load initially applied to the steering column may be reduced by minimizing the diameter of the molded pin.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A steering system of an automobile comprising:
    a mounting bracket having:
        a flange portion supporting a steering column and contacting with an automobile body; and
        an opening hole formed at the flange portion and opening toward one side of the flange portion;
    a capsule slidably coupled to the opening hole and adapted to be decoupled from the opening hole when an impact is given thereto; and
    at least one molded supporter fixing the capsule and the flange portion and adapted to be sheared off from the capsule or the flange portion when the impact is given thereto,
    wherein at least one stepped portion for receiving a molten resin is dented at the flange portion along a side of the opening hole on which the capsule is configured to slide.

2. The steering system of claim 1, wherein the at least one molded supporter is formed by solidifying molten resin after filling a space between the capsule and the flange portion with the molten resin.

3. The steering system of claim 1, wherein a pair of molded supporters is provided along both sides of the opening hole on which the capsule is configured to slide.

4. The steering system of claim 1, wherein a first insertion hole is formed on and is connected to the at least one stepped portion, and the first insertion hole is adapted to receive the molten resin.

5. The steering system of claim 4, wherein the at least one molded supporter includes a first supporting portion corresponding to the at least one stepped portion and a second supporting portion corresponding to the first insertion hole.

6. The steering system of claim 1, wherein a second injection hole is formed at a portion of the capsule contacting with the flange portion, and the molten resin is injected through the second injection hole.

7. The steering system of claim 6, wherein a molded pin is formed by solidifying the molten resin filling with the second injection hole, and the molded pin fixes the capsule to the molded supporter and is adapted to be sheared off by the impact.

8. The system of claim 1, wherein a distance between both sides of the opening hole becomes wider toward the one side.

9. The system of claim 8, wherein the both sides of the opening hole form an angle of about 8° to 12°.

10. The system of claim 1, wherein the capsule includes a slide groove to slidably receive the at least one molded supporter therein.

11. A steering system of an automobile comprising:
    a mounting bracket having:
        a flange portion contacting with an automobile body; and
        an opening hole formed at the flange portion and opening toward one side of the flange portion;
    a capsule slidably coupled to the opening hole and adapted to be decoupled from the opening hole when an impact is given;
    at least one molded supporter fixing the capsule and the flange portion and adapted to be sheared off from the capsule or the flange portion when the impact is given; and
    at least one molded pin fixing the molded supporter to the capsule and adapted to be sheared off by the impact,
    wherein at least one stepped portion is dented at the flange portion along a side of the opening hole on which the capsule is adapted to slide, and
    wherein the at least one molded supporter is formed by solidifying molten resin after filling the stepped portion with the molten resin.

12. The steering system of claim 11, wherein a first insertion hole connected to the at least one stepped portion and receiving the molten resin is formed on the at least one stepped portion.

13. The steering system of claim 12, wherein the at least one molded supporter includes a first supporting portion corresponding to the at least one stepped portion and a second supporting portion corresponding to the first insertion hole.

14. The steering system of claim 11, wherein a second injection hole is formed at a portion of the capsule contacting with the flange portion, and the molten resin is injected through the second injection hole.

15. The steering system of claim 14, wherein the molded pin is formed by solidifying the molten resin filling with the second injection hole.

16. The system of claim 11, wherein a distance between both sides of the opening hole becomes wider toward the one side.

17. The system of claim 16, wherein the both sides of the opening hole form an angle of about 8° to 12°.

18. The system of claim 11, wherein the capsule includes a slide groove to slidably receive the at least one molded supporter therein.

* * * * *